US008241109B2

(12) United States Patent
Muir et al.

(10) Patent No.: US 8,241,109 B2
(45) Date of Patent: Aug. 14, 2012

(54) GAMING MACHINE POWER FAIL ENHANCEMENT

(75) Inventors: Robert Lindley Muir, North Ryde (AU); John Boesen, North Ryde (AU); Mike Jones, North Ryde (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 0 days.

(21) Appl. No.: 12/635,499

(22) Filed: Dec. 10, 2009

(65) Prior Publication Data

US 2010/0093427 A1 Apr. 15, 2010

Related U.S. Application Data

(63) Continuation of application No. 11/039,008, filed on Jan. 11, 2005, now abandoned, which is a continuation of application No. PCT/AU03/00849, filed on Jul. 2, 2003.

(30) Foreign Application Priority Data

Jul. 3, 2002 (AU) ........................................ PS3335

(51) Int. Cl.
*A63F 9/24* (2006.01)
*A63F 13/00* (2006.01)

(52) U.S. Cl. ................ 463/24; 463/43; 714/21; 714/37; 714/39

(58) Field of Classification Search .................... 463/24; 714/21, 37, 39
See application file for complete search history.

(56) References Cited

U.S. PATENT DOCUMENTS

| | | | | | |
|---|---|---|---|---|---|
| 4,607,844 | A | * | 8/1986 | Fullerton | 463/24 |
| 4,782,468 | A | * | 11/1988 | Jones et al. | 463/24 |
| 4,799,683 | A | * | 1/1989 | Bruner, Jr. | 463/31 |
| 4,948,138 | A | * | 8/1990 | Pease et al. | 463/24 |
| 5,021,983 | A | * | 6/1991 | Nguyen et al. | 713/321 |
| 5,113,990 | A | * | 5/1992 | Gabrius et al. | 194/206 |
| 5,204,963 | A | * | 4/1993 | Noya et al. | 365/229 |
| 5,257,179 | A | * | 10/1993 | DeMar | 463/25 |
| 5,273,294 | A | * | 12/1993 | Amanai | 463/24 |

(Continued)

FOREIGN PATENT DOCUMENTS

JP 8229192 9/1996

(Continued)

OTHER PUBLICATIONS

International Search Report issued in connection with International Application No. PCT/AU2003/00849, dated Sep. 9, 2003 (7 pages).

*Primary Examiner* — Steven J Hylinski
(74) *Attorney, Agent, or Firm* — Hanley, Flight & Zimmerman, LLC

(57) ABSTRACT

An operating system for a gaming system includes a data producer which generates non-reproducible data relating to a transaction carried out in respect of the gaming system. A data consumer is in communication with the data producer for storing data relating to the non-reproducible data. A game controller is in communication with the data producer and the data consumer which effects communications between the data producer and the data consumer by means of a transaction-based protocol. The invention also relates to the use of data storage device for a gaming system that includes a local power supply.

12 Claims, 3 Drawing Sheets

U.S. PATENT DOCUMENTS

| | | | | | |
|---|---|---|---|---|---|
| 5,303,171 | A | * | 4/1994 | Belt et al. | 713/321 |
| 5,394,527 | A | * | 2/1995 | Fakhruddin et al. | 710/59 |
| 5,652,890 | A | * | 7/1997 | Foster et al. | 713/323 |
| 5,765,004 | A | * | 6/1998 | Foster et al. | 713/323 |
| 5,903,766 | A | * | 5/1999 | Walker et al. | 713/323 |
| 5,974,261 | A | * | 10/1999 | Fakhruddin et al. | 710/8 |
| 6,264,558 | B1 | | 7/2001 | Nishiumi et al. | |
| 6,383,076 | B1 | * | 5/2002 | Tiedeken | 463/40 |
| 6,503,147 | B1 | * | 1/2003 | Stockdale et al. | 463/29 |
| 6,743,095 | B2 | * | 6/2004 | Cole et al. | 463/25 |
| 6,758,757 | B2 | * | 7/2004 | Luciano et al. | 463/43 |
| 6,788,604 | B2 | * | 9/2004 | Yokota et al. | 365/218 |
| 6,804,763 | B1 | * | 10/2004 | Stockdale et al. | 711/170 |
| 6,811,486 | B1 | * | 11/2004 | Luciano, Jr. | 463/24 |
| 6,839,823 | B1 | * | 1/2005 | See et al. | 711/171 |
| 6,863,608 | B1 | * | 3/2005 | LeMay et al. | 463/24 |
| 6,921,337 | B1 | * | 7/2005 | Kennedy et al. | 463/42 |
| 6,968,405 | B1 | * | 11/2005 | Bond et al. | 710/72 |
| 7,043,641 | B1 | * | 5/2006 | Martinek et al. | 713/187 |
| 7,063,615 | B2 | * | 6/2006 | Alcorn et al. | 463/1 |
| 7,111,141 | B2 | * | 9/2006 | Nelson | 711/170 |
| RE39,401 | E | * | 11/2006 | Alcorn et al. | 463/29 |
| 7,139,912 | B2 | * | 11/2006 | Feinberg | 713/168 |
| RE39,666 | E | * | 5/2007 | Walsh et al. | 463/25 |
| 7,210,998 | B2 | * | 5/2007 | Kazaoka et | 463/29 |
| 7,351,151 | B1 | * | 4/2008 | Crowder, Jr. | 463/43 |
| 7,374,487 | B2 | * | 5/2008 | Nelson | 463/24 |
| 7,412,559 | B2 | * | 8/2008 | Stockdale et al. | 711/103 |
| 7,454,363 | B1 | * | 11/2008 | Rowe | 705/14.12 |
| 7,572,188 | B1 | * | 8/2009 | Kaifu et al. | 463/43 |
| 2001/0049303 | A1 | * | 12/2001 | Found et al. | 463/42 |
| 2002/0016193 | A1 | * | 2/2002 | Morris et al. | 463/1 |
| 2002/0142824 | A1 | * | 10/2002 | Kazaoka et al. | 463/16 |
| 2002/0142827 | A1 | * | 10/2002 | Aida et al. | 463/20 |
| 2003/0073495 | A1 | * | 4/2003 | D'Amico et al. | 463/42 |
| 2005/0010738 | A1 | * | 1/2005 | Stockdale et al. | 711/170 |

FOREIGN PATENT DOCUMENTS

| | | |
|---|---|---|
| JP | 2000312766 | 11/2000 |
| JP | 2001232002 | 8/2001 |
| JP | 2001310022 | 11/2001 |
| JP | 2002018061 | 1/2002 |

* cited by examiner

GAMING MACHINE POWER FAIL ENHANCEMENT

CROSS-REFERENCE TO RELATED APPLICATIONS

The present application relates to and claims the benefit of priority as a divisional of U.S. patent application Ser. No. 11/039,008, filed on Jan. 11, 2005, entitled "Gaming Machine Power Fail Enhancement," which is a continuation of International Application Number PCT/AU2003/000849, filed on Jul. 2, 2003, which claims priority of Australian Patent Application Number PS3335, filed on Jul. 3, 2002, each of which is herein incorporated by reference in its entirety.

FIELD OF THE INVENTION

This invention relates to gaming machines. More particularly, the invention relates to components for an electronic gaming machine and to a method of operating an electronic gaming machine.

BACKGROUND OF THE INVENTION

A trend in the gaming industry has been to use PC technology where possible instead of proprietary custom hardware and software. The Gaming Standards Association (GSA), an USA association of gaming machine manufacturers, peripheral manufacturers and operators, has been working towards standardising a communication protocol between a controller of an electronic gaming machine (EGM) and its peripherals based on universal serial bus (USB) technology, called B-Link. The intent is to standardise communication for virtually all peripherals in the EGM. Currently work is active on the coin hopper, bank note acceptor, coin acceptor, and printer.

Traditionally, EGM's have been custom designed to meet the specific requirements of gaming regulations promulgated by gaming control authorities. One important requirement is to maintain the integrity of critical data when the EGM loses power.

Critical data includes accounting information (known as meters) stored in battery backed static random access memory (SRAM), also referred to in this specification as meter RAM. Such memory chips have, to date, been directly interfaced to the main CPU of the EGM, enabling fast access to meter RAM. To comply with gaming regulations such as those in Australia, redundancy in the meter RAM has been used. For example, in Australia, three meter RAM chips are used, each storing the same data. In the event of a memory corruption in a single meter RAM chip, the other two chips are used to correct and restore the data.

Some meter information is also displayed on tamper resistant electro-mechanical counters, also known as mechanical meters. These mechanical meters are visible to an auditor and show cumulative values rather than duplicating the information in meter RAM as, unlike meter RAM, the mechanical meters cannot be reset to zero.

Updates to meter RAM must be completed as a single, uninterruptible transaction (ie. atomic); such that, once the update to the meter RAM has started, it must be completed. For example, if money is moved from one meter to another, it must first be subtracted in total from one meter then added to another. To avoid the loss of money in the event of a power failure, it must not be possible for a power fail to prevent the addition of the money to the second meter once it has been subtracted from the first meter.

In the case of mechanical meters, once the meter has started clicking over from one position to the next, it must continue to do so for the time required to guarantee correct operation (typically 25 ms), otherwise when power is restored to the EGM, it is not possible to determine the actual mechanical meter value.

In a conventional EGM, the mains power supply senses the mains power input and when it is detected to be failing, the power supply generates a power fail warning to the controller of the EGM. The time between the power fail warning and the power actually failing is known as the hold-up time. What is meant by "failing" is that the power supply is outside normal operating parameters or specifications, ie. it may be that power is available but it is insufficient for the EGM to operate correctly or at all.

Once a power failure has been detected, the controller completes any in-progress updates to meter RAM and the mechanical meters and accepts no further updates. The power supply is designed to have sufficient hold-up time for the controller to shut the EGM down in an orderly manner, adding considerable cost to the power supply.

An important effect of the change from custom hardware and software to standard PC technology is the lack of control in the response time of the controller to external or peripheral events. The GSA B-Link standard recognises this problem and, rather than customise the PC standard hardware/software to meet these real-time requirements, the standard changes the requirements of the peripherals and peripheral communications protocols. Critical peripherals store the critical data sent to the EGM controller, even over power down/up, until its receipt has been acknowledged by the EGM controller.

Jackpot controllers interface to a number of gaming machines and provide a network based prize. Jackpot controllers require data to be reliably stored over the power failure interval.

SUMMARY OF THE INVENTION

According to a first aspect of the invention, there is provided an operating system for a gaming system, the operating system including:

a data producer which generates non-reproducible data relating to a transaction carried out in respect of the gaming system;

a data consumer in communication with the data producer for storing data relating to the non-reproducible data; and a game controller in communication with the data producer and the data consumer which effects communications between the data producer and the data consumer by means of a transaction-based protocol.

In this specification, the term "transaction" is to be understood as non-reproducible data which needs to be processed in its entirety or, as it is referred to in the industry, atomically. It is not possible for a transaction to be partially processed, particularly in the event of a power failure.

In one embodiment of the invention, the gaming system may be a stand-alone gaming machine. Then, the data producer may be a peripheral device of the gaming machine. The peripheral device may be selected from the non-exhaustive group of a bank note acceptor, a coin hopper, a coin acceptor, a printer, an electromechanical meter and combinations of the aforegoing.

The data producer may include a non-volatile memory means in which the non-reproducible data, which arises from an event that has occurred at the data producer, are stored. The non-reproducible data relating to the transaction may be fed to the game controller as a transaction message.

The transaction message from the data producer may include transaction identification data which are unique to the transaction that has occurred at the data producer. Further, the transaction message may include data relating to an identity of the data producer.

Typically, the data consumer is meter random access memory (RAM) or SRAM of the gaming machine. The RAM may form part of a meter RAM controller board, the controller board including a transaction processing means and a power status indicating means. The power status indicating means may form part of a power supply unit of the meter RAM controller board.

The RAM may include multiple meter RAM chips for data redundancy. Updates to the meter RAM chips may be performed in any suitable order. For example, each chip may be updated fully before starting on a following chip or the chips may be updated in parallel.

In another embodiment of the invention, the gaming system may be a distributed gaming system comprising at least one gaming machine communicating with a server. In this embodiment, the data producer may be a peripheral device of the at least one gaming machine. Once again, the peripheral device may be selected from the non-exhaustive group of a bank note acceptor, a coin hopper, a coin acceptor, a printer, an electromechanical meter and combinations of the aforegoing.

The data consumer and the game controller may be constituted by the server. The data consumer may comprise a hard disk drive and associated software. The data consumer may further include a power supply means with a power status indicating means.

The transaction-based protocol may be a USB protocol.

According to a second aspect of the invention, there is provided a method of operating a gaming system, the method including the steps of generating non-reproducible data relating to a transaction carried out in respect of the gaming system;

storing data relating to the non-reproducible data; and using a transaction-based protocol in a game controller to effect communication between a data producer that generated the non-reproducible data and a data consumer in which the data relating to the non-reproducible data are stored.

The method may include, when an event occurs at the data producer, storing the non-reproducible data relating to the transaction associated with the event in a non-volatile memory of the data producer.

The method may include, when the event occurs, generating a transaction message at the data producer and supplying the transaction message to a game controller of the gaming system, the transaction message including a transaction-ID relating to an identity of the transaction and a producer ID relating to the data producer of the gaming system at which the transaction occurred.

Then, the method may include, when the transaction message is received by the game controller, updating a memory of the game controller.

The data consumer may be a meter of the gaming system and the method may include using the game controller to calculate new meter values for the data consumer.

The method may include creating a new transaction message, incorporating the same transaction-ID and producer-ID, at the game controller and forwarding the new transaction message to the data consumer to update meter values in the data consumer. Further, the method may include, after processing of the message, returning an acknowledgment message, with the same transaction-ID and producer-ID, from the data consumer to the game controller.

The method may include passing the transaction-ID and the producer-ID in the acknowledgment message from the game controller to the data producer at which the event occurred. The method may include deleting the original non-reproducible data from a memory means of the data producer when the data producer receives the acknowledgment with the same transaction-ID from the game controller.

The method may include using a USB protocol as the transaction-based protocol.

According to a third aspect of the invention, there is provided a data storage sub-assembly for a gaming system, the sub-assembly including:

a data storage means for storing data relating to non-reproducible data relating to a peripheral device of the gaming system;

a transaction processing means for processing the non-reproducible data relating to the peripheral device of the gaming system; and a power status indicating means for providing an indication of power status to the transaction processing means.

The sub-assembly may include a local power supply unit which receives power from a main power supply unit of the gaming system, the local power supply unit including the power status indicating means for providing data relating to power status to the transaction processing means.

The data relating to the non-reproducible data may include information relating to an unique transaction identification means and an unique peripheral device identification means and, when the transaction processing means receives a message relating to a transaction effected by, or at, the peripheral device is received, the transaction processing means may use the information to determine if that message had previously been received and the data contained in that message stored.

According to a fourth aspect of the invention, there is provided a meter assembly for a gaming system, the meter sub-assembly including:

at least one electromechanical meter which records data relating to transactions occurring in the gaming system; and a local power supply unit associated with said at least one electromechanical meter, the local power supply unit being powered by a power supply unit of the gaming system and the local power supply unit providing sufficient hold-up time to enable said at least one electromechanical meter to complete a data recording operation in the event of a power failure.

The term "hold-up time" is to be understood as the time for which sufficient power is supplied by a power supply unit to a powered device, when a power supply failure is detected, to enable a transaction to be completed by the powered device before the gaming machine is shutdown.

Preferably, a plurality of electromechanical meters or counters are mounted on a board with the local power supply unit, a power fail detect/warning means, a meter update means, a non-volatile memory means and a communication means for communicating with a controller of the gaming system.

The meter update means may be operable to vary the sequence of power to the meters during the hold-up time. For example, when eight electromechanical meters are provided, only one meter may be powered at a time and only one eighth of the power is required but would take eight times as long.

The meter update means is, preferably, a microcontroller but could also be implemented in the form of dedicated logic such as a field programmable gate array.

The communication means preferably makes use of a universal serial bus (USB) interface.

An alteration in state of the at least one electromechanical meter when it records data relating to transactions occurring in the gaming system may constitute non-reproducible data to be stored in a data consumer of the gaming system.

The mechanical meters may be the producer of the first aspect of the invention.

According to a fifth aspect of the invention, there is provided a method of updating data on meter RAM of a gaming system, the method including the steps of:

creating a backup copy of original meter data and storing the backup copy in a predetermined, second data storage location of a memory device of the meter, receiving new meter data and overwriting the original meter data at an original, first data storage location of the memory device; and prior to implementing the action of overwriting the data, changing the status of a status indicating means.

The status indicating means may be a flag and the method may include examining the status of the flag every time power is restored after a power failure to determine if the power failure interrupted a meter update.

The method may include, if there has been an interruption to the meter update, using the contents at the second data storage location to restore the original meter data.

The method may include writing the data at the second data storage location to the first data storage location to overwrite any data at the first data storage location potentially corrupted due to the power failure.

Further, the method may include, once an update transaction has been received by the memory device and a backup copy has been made, changing the flag status to "updating". Still further the method may include processing the transaction and, when complete, changing the flag status to "not updating". If power fails before the flag is first changed to "updating", then the data at the first data storage location is not modified and, when power is restored, the original meter values are unchanged. If power fails after the flag has been changed to "updating" but before it has been changed back to "not updating", then the backup copy can be used to restore the original data. If the power fails after the flag has changed status back to "not updating" then the transaction has been completed successfully and the power failure will not have corrupted the data.

According to a sixth aspect of the invention, there is provided a data updating arrangement for meter RAM of a gaming system, the data updating arrangement including:

a memory device including a first data storage location for storing original meter data; and a second data storage location for storing a backup copy of the original meter data and for enabling new meter data to be written to the first data storage location; and an update status indicating means for indicating the status of updating data at the first data storage location.

The update status indicating means may be in the form of an update status flag which indicates the status of a meter update at the first data storage location. The status flag may take one of two states, either "updating" or "not updating". This flag may be examined every time power is restored to the data updating arrangement after a power failure to determine if the power failure interrupted a meter update. If an interruption did occur, the contents at the second data storage location may be used to restore the original meter data. In other words, the data at the second data storage location may be written to the first data storage location to overwrite any data at the first data storage location that may have been corrupted due to a power failure.

Once an update transaction has been received by the memory device and a backup copy has been made, the flag status may be changed to "updating". The transaction may then be processed and, when complete, the flag status may be changed back to "not updating". If power fails before the flag is first changed to "updating", then the data at the first data storage location is not modified and, when power is restored, the original meter values are unchanged. If power fails after the flag has been changed to "updating" but before it has been changed back to "not updating", then the backup copy can be used to restore the original data. If the power fails after the flag has changed status back to "not updating" then the transaction has been completed successfully and the power failure will not have corrupted the data.

According to a seventh aspect of the invention, there is provided an electronic gaming machine which includes:

a game controller board including a game controller;

at least one peripheral device by means of which a game transaction is effected, said at least one peripheral device communicating with the game controller by means of a transaction-based protocol; and a data storage sub-assembly for storing data relating to said transaction, the data storage sub-assembly communicating with the peripheral device and the game controller by means of the transaction-based protocol, the data storage sub-assembly including a dedicated controller for controlling operation of the data storage means.

The data storage sub-assembly may include a local power supply which receives power from a main power supply of the gaming machine. The local power supply may communicate with the dedicated controller of the data storage sub-assembly to alert the controller of the data storage means to a power fail event to enable the controller to effect recording of data during a hold-up time of the local power supply.

The transaction-based protocol may be a USB protocol.

BRIEF DESCRIPTION OF THE DRAWINGS

The invention is now described by way of example with reference to the accompanying drawings in which.

DETAILED DESCRIPTION OF THE INVENTION

Figure 1:
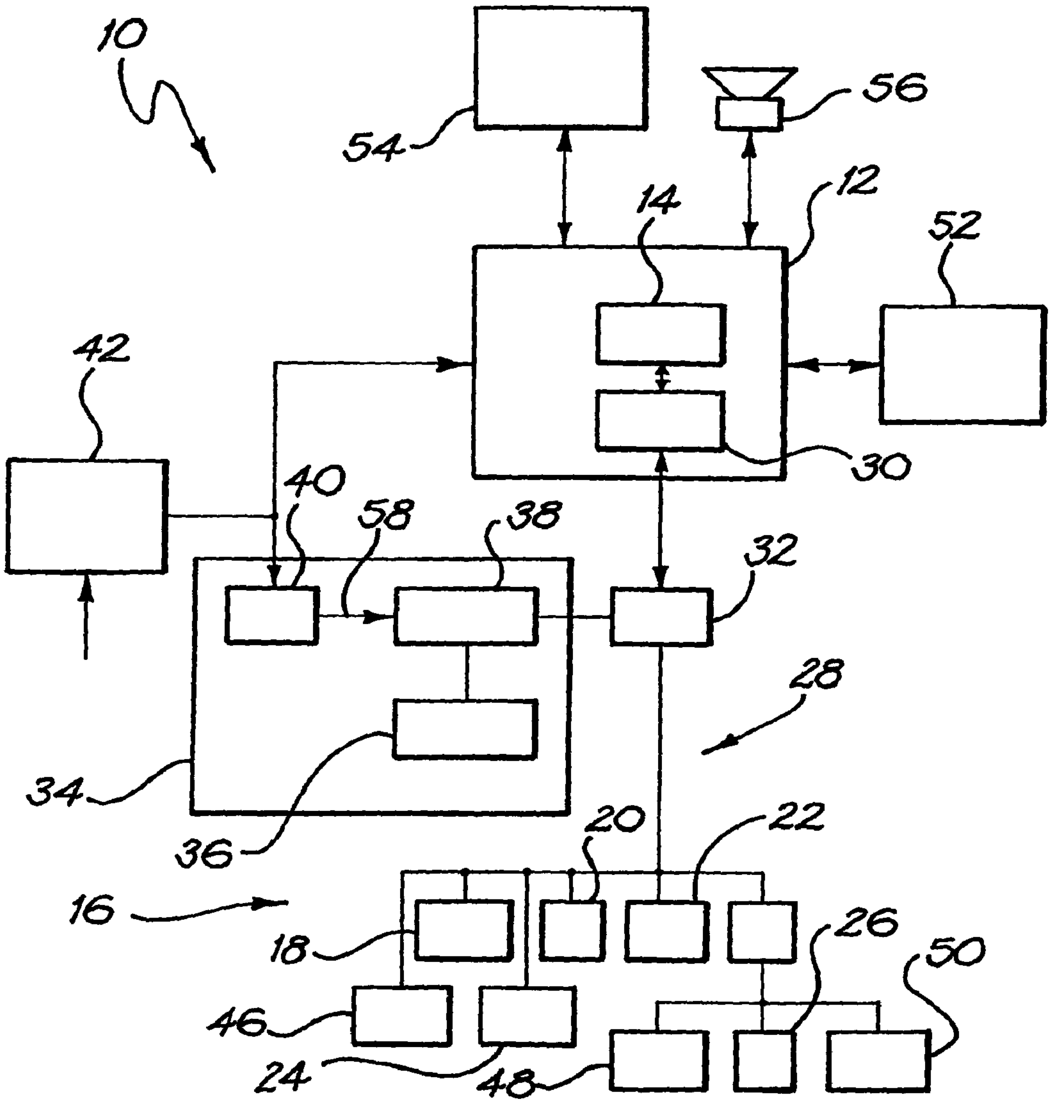
FIG. 1 shows a block diagram of an electronic gaming machine, in accordance with an aspect of the invention.

Referring initially to FIG. 1 of the drawings, reference numeral 10 generally designates a gaming machine in accordance with an aspect of the invention. The gaming machine 10 includes a game controller board 12 which incorporates a game controller 14. The gaming machine 10 further includes a plurality of peripheral devices indicated generally at 16. Some of these peripheral devices 16 such as a bank note acceptor 18, a coin hopper 20, a coin acceptor 22, a mechanical meter board 24 and a printer 26 produce non-reproducible data and are also referred to below as data producers or producers.

The peripheral devices 16, in general, communicate with the game controller board via a transaction-based protocol 28. The protocol 28 is a USE protocol. Accordingly, a USB root hub 30 is incorporated on the game controller board 12. The root hub 30 communicates with the peripheral device 16 through a USB hub 32.

A data consumer in the form of a meter RAM controller board 34 communicates with the game controller board 12 and the peripheral devices 16 via the USB hub 32.

Each meter RAM controller board 34 includes a data storage means in the form of meter RAM 36. For redundancy purposes, the meter RAM 36 comprises a plurality of meter RAM chips. For example, the meter RAM 36 includes three meter RAM chips, each of which stores the same transaction-based data The meter RAM 36 is controlled by a dedicated microcontroller 38.

Each board 34 further includes a local power supply 40. The local power supply 40 is powered by a main power supply 42 of the gaming machine.

Other peripheral devices which communicate with the game controller board 12 are a touch screen 46, a light tower 48 and a progressive display 50. However, these latter peripheral devices 46, 48 and 50 do not generate non-reproducible data and need not have a transaction-based protocol associated with them.

The game controller board 12 includes a memory storage means in the form of a hard disk 52. The game controller board 12 further controls, in a conventional fashion, information which is displayed on a display unit 54 of the gaming machine and audible data which is output on a sound system 56 of the gaming machine 10.

In accordance with regulatory requirements, certain data has to be recorded on the meter RAM 36 of the gaming machine 10 for auditing purposes and for record keeping purposes. The data includes, in general, money or monetary value which is either received from a player of the gaming machine 10 or is paid to the player. In this specification, a transaction is regarded as an atomic transaction, ie. one which must be completed in its entirety so that accurate records can be kept. In particular, the gaming machine 10 cannot fail during the recording of the transaction otherwise incomplete data may be recorded or the transaction itself may be incomplete. In other words, it is a transaction which can never only be partially processed, even in the event of a power failure.

In the description which follows, certain items of terminology have certain meanings assigned to them as follows:

A "transaction-ID" is an identifier that uniquely identifies a transaction. The number of different transaction ID's used is finite and can be limited by the number of simultaneous transactions which can occur in the gaming machine 10.

A "consumer" receives a transaction, takes some action and returns an acknowledgment message with the same transaction-ID. In this case, the consumer is the meter RAM controller board 34.

A "producer" is the source of a transaction. Thus, one of the peripheral devices 18, 20, 22, 24 or 26 could be a producer as it creates a transaction in response to money or money's worth inserted into the gaming machine by the player 10 or paid out to the player of the gaming machine 10, as the case may be. Although the mechanical meters 24 of the gaming machine do not receive or pay out money or monetary value to the player, they record payments made or received as a backup to the meter RAM 36 of the gaming machine 10 and are not able to be reset as is the case in respect of the meter RAM 36. Accordingly, the meters of the mechanical meter board 24 produce critical data and, as such, are considered to be producers.

"Critical data" is to be understood as data which are non-reproducible. They are data which are generated by one of the peripheral devices 16 that cannot be derived from any other data in the gaming machine 10. Typically, they are user input or input/output from the peripheral devices 16 and are stored in non-volatile memory in the peripheral devices 16 so that they are not lost when power fails. A transaction-ID created by any one of the producers is also non-reproducible data. Conversely, reproducible data can be derived from the non-reproducible data.

A "producer-ID" is one that uniquely identifies the producer of the transaction.

A "message" is a communication from one component of the gaming machine 10 to another. In this case, a message is a communication between one of the producers 18, 20, 22, 24, 26 and the transaction processor/game controller board 12 of the gaming machine 10 or between the transaction processor/game controller board 12 and the data consumer in the form of the meter RAM controller board 34.

For the sake of simplicity, the way in which communications are effected by the gaming machine 10 is described as sending and receiving messages. Those skilled in the art will appreciate that, in practice, at the lower protocol levels, USB has master/slave architecture with the master polling slaves to see if they have messages which are to be sent.

The game controller board 12 controls the execution of the game logic, game outcome, display 54, and peripheral devices 16. The meter RAM controller board 34 contains the meter RAM 36, a transaction processing means in the form of the microcontroller 38, the local power supply 40 and a local power fail detection/warning means 58. The microcontroller 38 also serves as the communication interface to the game controller board 12. Updates to meter RAM 36 are directly controlled by the microcontroller 38 which receives transaction messages from the game controller 14 and updates the meter RAM 36 accordingly. The transaction processing means could be implemented in dedicated logic such as a field programmable gate array (FPGA), instead of being a microcontroller.

In use, to update the meter RAM 36, the game controller 14 creates a message containing those updates required and sends it to the meter RAM controller board 34. Preferably, the message consists of a list of memory addresses and new data values, the transaction-ID and producer-ID as well as error checking and other protocol overhead as required.

After a power-up it is possible for a message from the relevant peripheral device 18, 20, 22; 24 or 26 to be repeated, and it is important that the microcontroller 38 of the meter RAM board 34 not process the message more than once. The microcontroller 38 stores in meter RAM 36 the transaction-ID of the last message for each peripheral device 18, 20, 22, 24 or 26, identified using the producer-ID, of the gaming machine 10.

Instead, the game controller 14 passes the repeated message to the microcontroller 38 which acknowledges the repeated message without processing it further. Preferably however the game controller 14 uses this data simply to acknowledge a repeated message itself, rather than resending it to the microcontroller 38 of the meter RAM controller board 34, as would otherwise be the case.

In an implementation where the game controller 14 caches the meter RAM this would cause the meter RAM 36 and cached meter RAM to become different. Consequently, in this case, after the microcontroller 38 processes the message, the appropriate meters in the cache are reloaded from the meter RAM 36.

Before starting to update the meter RAM 36, the microcontroller checks the local power fail warning 58 and, if power is in order, the meter update starts. If the power has started to fail, the meter update is not started and when power fails the entire transaction is lost. Once started the update must run until completion and the power fail hold-up time is designed to be sufficient for the longest meter update sequence possible. Included in the transaction is the transaction-ID and producer-ID. To enable the gaming machine 10 to restore data correctly after a power fail, the meter RAM microcontroller 38 stores the last transaction-ID processed for each of the relevant peripheral devices 18, 20, 22, 24 or 26 of the gaming machine 10.

Meter update transactions are quite short and can be written to meter RAM 36 quickly. For example, a maximum sized transaction of 256 bytes can be written in under 1 ms. The power supply hold-up requirement of the meter RAM controller board 34 for this short time is much easier to meet than is required in a conventional gaming machine 10 where the far more powerful main CPU and associated logic must be powered and a customised power supply is needed.

As indicated above, in some implementations, the meter RAM 36 comprises multiple RAM chips for data redundancy. For example, in Australia, the meter RAM 36 comprises three RAM chips. Memory updates may be performed in any suitable order. For example, each memory chip may be updated fully before starting on another or the memory chips may be updated in parallel with the meter value being updated in each memory chip before moving on to the next meter value.

In another implementation, the meter RAM controller board 34 uses a power fail detection of the main supply 42 but with its own local power supply hold-up. While the main power supply 42 is still operating the local power supply 40 is also certain to be operating. This simplifies the design of the meter RAM controller board 34 slightly although the main power supply 42 now requires power fail detection.

The duration of the power supply warning 58 can be reduced to that of a single memory write by allowing the meter update to potentially fail but detecting and undoing these failed updates when power is restored. This results in a dramatic improvement as the hold-up time is reduced to the time it takes to update, at most, several memory locations instead of the previous requirement to update all memory locations in the transaction.

To achieve this, before updating the new meter RAM values, a backup copy of the original meter RAM data is made in a location of the meter RAM 36 reserved for this purpose. The backup copy contains the original data, that data's original memory location, and a count of the number of data values in the backup buffer. In the event of a power failure and the meter RAM 36 not being fully updated, this backup copy is used to restore the original state of the meter RAM 36.

An update status flag indicates the state of meter update and takes one of two states, either "updating" or "not updating". This flag is examined every time the power is restored to the board 34 to determine if a power failure interrupted a meter update, and if it did the contents of the backup memory are used to restore the original meter data.

Once the update transaction has been received and the backup copy has been made, the flag status is changed to "updating". The transaction is processed and, when complete, the flag is changed back to "not updating". If the power fails before the flag is first changed to "updating", then the meter RAM 36 is not modified and, when power is restored, the original meter values are unchanged. If the power fails after the flag has changed to "updating", but before it has changed back to "not updating", then the backup is used to restore the original data. If the power fails after the flag has changed back to "not updating" then the transaction has completed successfully.

The power fail hold-up may be as small as the time it takes to start and complete a single memory write to the update status flag, which will typically be under 100 ns for a static RAM (SRAM) chip. For a complete meter update that takes 100 µS, this is an improvement of 1000 times.

As previously described, some implementations will have multiple redundant RAM chips storing the same data, for example, three meter RAM chips. When the update status flag is written to indicate the completion of the update, consideration needs to be given to power failing after updating the status flag for one meter RAM chip and before updating another. In such a case, all meter RAM chip data would be individually valid but different. One meter RAM chip may contain the original data while others may contain the data after the completed transaction. In a sense they are both correct but only one can be used.

Two methods can be used to resolve this situation. One meter RAM chip could be chosen either, arbitrarily, the most up to date or, when possible, by a majority vote amongst them and the contents of the chosen chip copied to the others, making them identical. Preferably, however, all the meter RAM chip update operations, except the final flag update, are completed for each of the meter RAM chips. The status flags are then updated consecutively for each of the meter RAM chips as fast as possible. The power hold-up requirement is increased to cover the time from the first to last status flag write, ie. three write cycles in the case of three meter RAM chips, which is typically less than 1 µS.

Instead, in another implementation, the updated transaction can be processed as soon as the message starts to arrive without waiting for the end of the message to be received. This allows the transaction to be processed more quickly and improves the response time. In this implementation, the backup copy is created as the meter update progresses as follows: backup each word before overwriting, then process the next word rather than in one go before the meter update starts. A counter of the number of meter values written must also be kept to enable the correct number of words to be restored in the event of a power fail. Again the hold-up time is reduced to a single memory write but this time it is the counter value that must be written correctly. In the event of a communication error in the message, the update is cancelled and the original contents of the meter RAM are restored.

Figure 3:
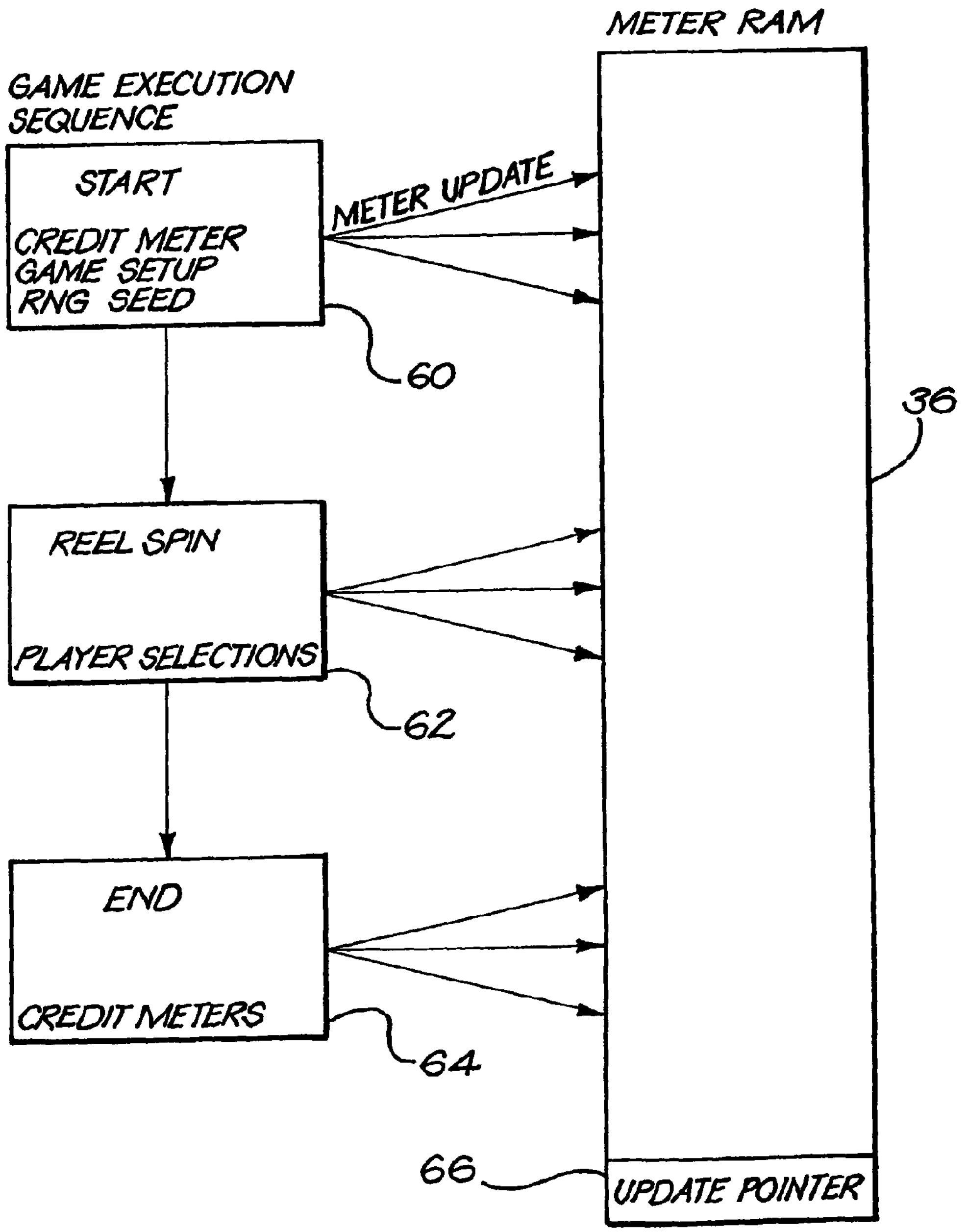
FIG. 3 shows a simplified block diagram of how meters are updated, in accordance with the invention, in respect of a simple spinning reel game played on the gaming machine.

The playing of a game and the control sequence used to update meters proceeds as in a traditional gaming system. FIG. 3 shows how meters are updated in a simple spinning reel game. Each of the blocks, START 60, REEL SPIN 62, and END 64, represent stages of the game in which meter updates are atomic, but between which the power may fail and be restored. Within these blocks 60, 62 and 64, non-reproducible data, such as player inputs, credit information and random number output are stored. All other data, such as that used in-between these states, can be derived from these non-reproducible data. As the meter RAM 36 is updated, a pointer 66 keeps track of where the updates occur. Should the power be interrupted, this pointer 66 is used to determine the correct state to restart the game.

Figure 2:
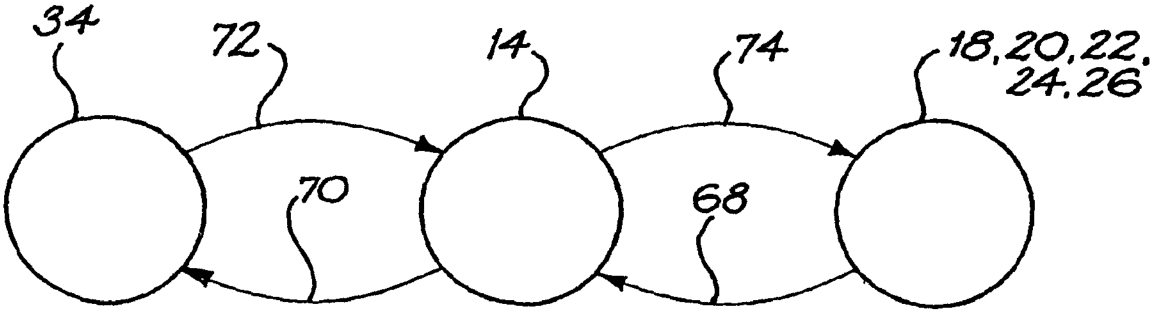
FIG. 2 shows a communication data flow diagram of storing data relating to a transaction of the gaming machine, also in accordance with the invention.

Referring to FIG. 2, the architecture of the gaming machine 10 is more complex and inherently slower due to creating and processing transactions, and the less direct coupling of the meter RAM 36 to the game controller 14, but has the aforementioned advantages.

Typically, in response to external events, a producer 18, 20, 22, 24, 26 creates non-reproducible data and stores the data in its own non-volatile memory. The producer 18, 20, 22, 24, 26 then creates a transaction message with a new transaction-ID and sends it to the transaction processor (the game controller 14) as shown at 68.

The transaction processor transforms the transaction message and sends it to the consumer (the meter RAM 36) as shown at 70. After processing the message, the consumer returns an acknowledge message as shown at 72 with the same transaction-ID back to the transaction processor which, in turn, passes it back to the original producer 18, 20, 22, 24, 26 as shown at 74. When the producer 18, 20, 22, 24, 26 receives the acknowledgment with the same transaction-ID as the original message it created, the producer 18, 20, 22, 24, 26 deletes the non-reproducible data from its non-volatile memory.

The consumer stores in non-volatile memory the transaction-ID of the last message it processed. Should the power fail this is used to restore the gaming machine 10 to correct operation. When power is restored the game controller 14 checks the producer for outstanding messages which will exist until the non-reproducible data are deleted. The controller 14 sends this message to the microcontroller 38 and, hence, on to the consumer. If the consumer had previously processed this message, as determined by the transaction-ID, an acknowledgment is returned to the game controller 14, without processing the message again.

Preferably, the message created by the game controller 14 and sent to the consumer (the meter RAM 36) contains a list of meter addresses and new data which will simply overwrite the existing values in meter RAM 36. The game controller 14 maintains a cached copy of the meter RAM data and uses this to determine the new meter RAM values in the message.

Where there is more than one producer 18, 20, 22, 24, 26, as would normally be the case in a gaming machine, the messages are also identified as to the producer that created them by means of the producer-ID contained in the message. This allows the game controller 14 to return the acknowledgment message to the originating producer 18, 20, 22, 24, 26. An extra field in the transaction and acknowledgment messages can be used for this purpose. The consumer stores the last transaction-ID for each producer in the system and a table in non-volatile memory is used for this purpose.

An example is described using the bank note acceptor (BNA) 18 as the data producer. The BNA 18 creates non-reproducible data when it accepts a bank note from the player. The BNA 18 creates a message 68 (with new transaction-ID) and sends it to the game controller 14 (transaction-processor). The game controller 14 calculates the appropriate new meter values (eg. cash-in), and creates a new transaction and transaction message 70 (using the same transaction-ID) to adjust the meter values in the meter RAM 36 (consumer). After processing the message, the microcontroller 38 on the meter RAM controller board 34 returns an acknowledge message 72 with the same transaction-ID to the game controller 14, which passes the message 74 back to the BNA 18. When the BNA 18 receives the acknowledgment 74 with the same transaction-ID as the original message it created, the BNA 18 deletes the original non-reproducible data from its non-volatile memory.

Only the BNA 18 has non-reproducible data; the meter update message and acknowledgments are reproducible data as they can be derived from the non-reproducible data within the BNA 18.

If the power fails after the non-reproducible data has been created, but before it is acknowledged and hence deleted, the gaming machine 10 automatically recovers.

After power is restored the sources of non-reproducible data (producers) are checked for any outstanding transaction messages. The BNA 18 responds by repeating the same message as previously, assuming non-reproducible data exists, and this message is sent though the same path as already described. The game controller 14 receives and transforms the message exactly as before and sends it to the microcontroller 38.

If the microcontroller 38 had not completed the transaction before the power failure, as determined by the last-transaction-ID and the last-producer-ID, then the process proceeds as described previously. If the microcontroller 38 had previously completed the transaction, it sends an acknowledgment but otherwise ignores the message and the meters are not updated. The game controller 14 receives the acknowledgment and passes it back to the BNA 18 as previously described. It can therefore be seen that the gaming machine 10 is restored to correct operation and data are not lost, no matter when or how many times he power fails.

In the case of a coin hopper 20, a non-transaction message from the game controller to the hopper 20 instructs it to pay out coins. The hopper 20 (producer) creates non-reproducible data when a coin is paid out. The hopper 20 creates a message 68 (with new transaction-ID) and sends it to the game controller 14 (transaction-processor). The game controller 14 calculates the appropriate new meter values (eg cash-out), and creates a new transaction and transaction message 70 (using the same transaction-ID) to adjust the meter values in the meter RAM 36 (consumer). After processing this message 70, the microcontroller 38 returns an acknowledge message 72 with the same transaction-ID to the game controller 14 which, in turn, passes an acknowledgment 74 back to the hopper 20. When the hopper 20 receives the acknowledgment with the same transaction-ID as the original message it created, the hopper 20 deletes the non-reproducible data from its non-volatile memory.

As described for the BNA 18, the gaming machine 10 is always restored correctly after a power failure.

Figure 5:
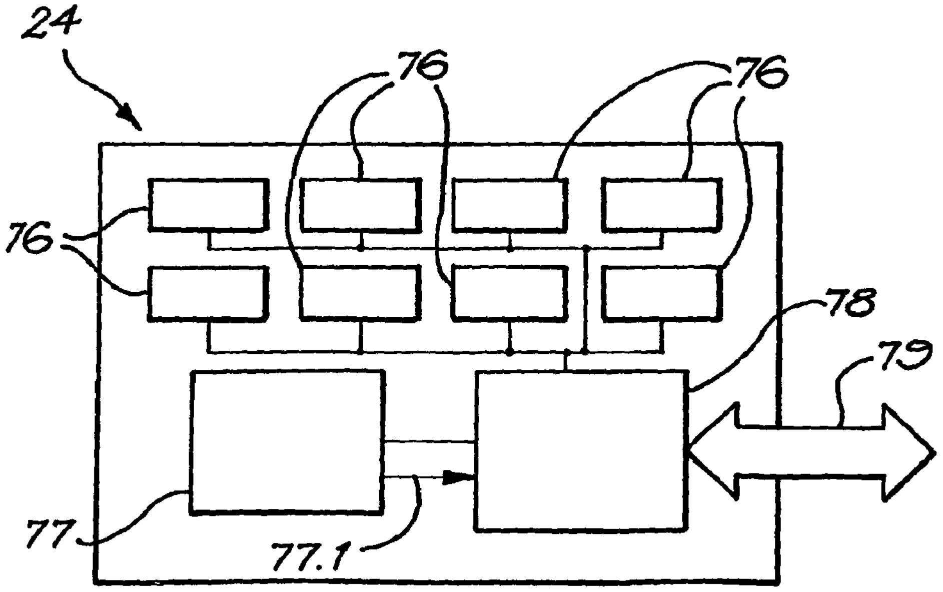
FIG. 5 shows a simplified block diagram of a mechanical meter board, in accordance with another aspect of the invention, of a gaming machine

In the case of the mechanical meter board 24, preferably eight electromechanical counters 76 (FIG. 5) are mounted on the board 24, together with a local power supply 77, a power fail detect/warning means 77.1, a meter update means 78, non-volatile memory (not shown), and a communications means 79 to the game controller 14.

The meter update means 78 is, preferably, a microcontroller but could also be implemented as dedicated logic such as an FPGA. The communication means 79 is preferably USB.

Typically an electromechanical meter 76 requires power applied continuously for at least 25 ms then removed for at least another 25 ms to count properly. To maintain an accurate count, it is critical that, once power has been applied to the meters, it is applied for at least the minimum time. When power fails, the local power supply 77 generates a power fail warning on the power fail detect/warning means 77.1 and supplies power for at least a further 25 ms.

By moving the power hold-up requirement from the main power supply 42 to the mechanical meter board 24; the power requirement and, hence, cost is significantly reduced. Traditionally most, if not all, of the gaming machine 10 would be powered at the same time as the mechanical meters.

To reduce the power required during power fail hold-up the sequence of powering the meters may be varied. For example, if only one counter 76 is powered at a time, this requires one eighth of the power of eight counters 76, but takes eight times as long (or one fourth if the eight counters 76 are powered in two phases).

When a non-transaction meter update message is received from the game controller 14, the power fail signal is first checked. If the power has started to fail the electromechanical counters 76 are not updated, and the message is lost when the power fails. If the power has not started to fail then a counter 76 update is started and is completed as the local power supply 77 has the necessary power hold-up capability (ie. 25 ms).

The mechanical meter board 24 (producer) creates non-reproducible data when the counters 76 are updated, then creates a transaction message 68 (with new transaction-ID) and sends it to the game controller 14 (transaction-processor). The game controller 14 calculates the appropriate new meter values and creates a new transaction and transaction message 70 using the same transaction-ID to adjust the meter values in the meter RAM 36 (consumer). After processing this message the microcontroller 38 returns an acknowledgment 72 with the same transaction-ID to the game controller 14 which passes an acknowledgment 74 back to the mechanical meter board 24. When the mechanical meter board 24 receives the acknowledgment 74 with the same transaction-ID as the original message it created, the board 24 deletes the non-reproducible data from its non-volatile memory.

As described for the BNA the system is always restored correctly after a power failure.

In another implementation of the invention, the game controller 14 of the gaming machine 10 is divided into a peripheral controller and a game outcome controller The peripheral controller is interfaced to peripherals devices that do not necessarily save their state in the event of a power failure. The peripheral controller also includes local power supply, local power fail support, non-volatile memory for the peripheral devices and meter RAM. The game outcome controller runs the games, determining game outcome and displaying the game. Preferably it does not use power fail to save game or peripheral information.

In this implementation, the peripheral controller stores peripheral data over the power fail interval; it is the combination of peripheral controller hardware/software and peripheral device itself that creates the data producer. In a similar way, the combination of peripheral controller and non-volatile storage forms the data consumer 36. The game outcome controller still functions as the transaction processor.

Preferably a single board functions as the peripheral controller for all peripheral devices in the gaming machine 10, although each peripheral device could have a separate peripheral control board. Peripheral devices that do not require information to be saved over the power fail interval may be interfaced either to the peripheral controller or to the game outcome controller as desired.

Figure 4:
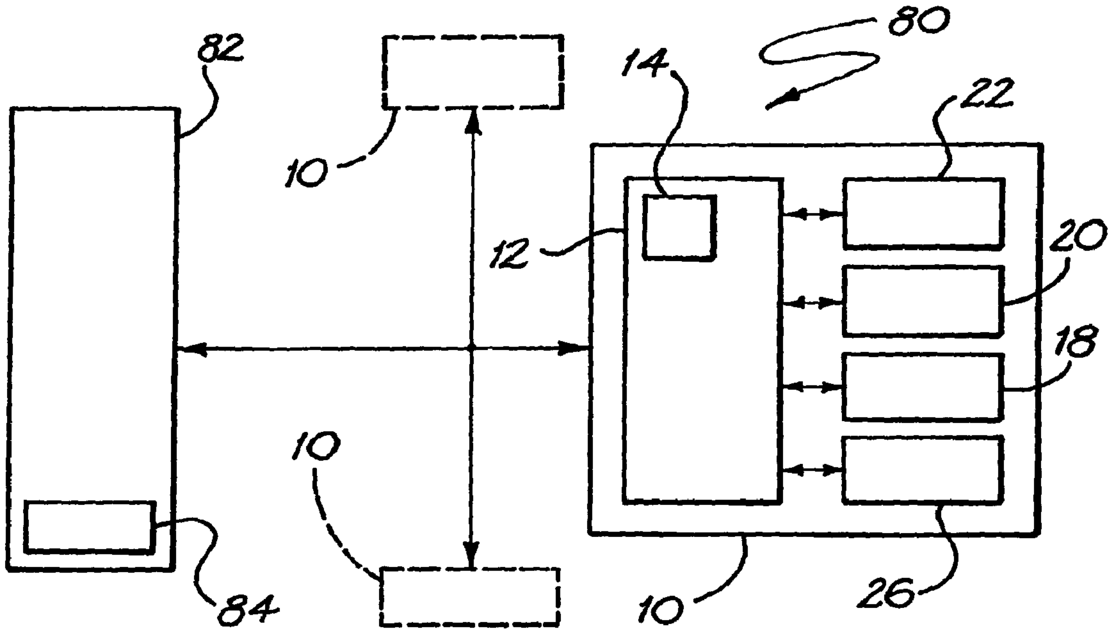
FIG. 4 shows a simplified block diagram of a distributed gaming system implemented in accordance with an aspect of the invention.

Referring to FIG. 4, an implementation of the invention in a distributed gaming system 80 is now described. With reference to the previous drawings, like reference numerals refer to like parts unless otherwise specified.

The system 80 includes a server 82 which, in addition to determining game outcomes, acts as both transaction-processor and data consumer 84. The game controller 14 of each gaming machine 10 of the distributed system 80 simply acts to pass messages between the server 82 and the peripheral devices 18, 20, 22 and 26.

In the server 82, the consumer 84 comprises a hard disk drive or RAID array instead of meter RAM, as it is more cost effective for a large number of gaming machines 10. The consumer 84 comprises software running on the server 82, the hard disk to store the data, and, preferably, an uninterruptible power supply with power fail warning.

The transaction processor and the consumer 84 may be implemented as a single program or as multiple programs on one server or they may be distributed over multiple servers. The consumer 84 may also be implemented as a standard database application/server.

The invention applies also to a jackpot controller which, it will be appreciated, is, in use, a form of distributed gaming system. A jackpot controller requires data to be stored over the power fail interval, typically including the current level of all prizes, and which machines have one the most recent prizes. This invention provides the separate storage of data in a board easily interfaced to the controller, and removes the requirement of power fail hold-up on the main circuits of the controller.

The invention could apply equally to the use of computer game consoles as the controller for a gaming system. Such gaming consoles have powerful processors and graphics capability. However they are not suitable for gaming machines due to the lack of gaming specific features, especially meter RAM and power fail detection. To add these features in the traditional manner would require significant engineering effort. However, with the present invention and the use of a separate local power supply and the use of appropriate protocols, these features can be added with less difficulty.

It is, accordingly, an advantage of the invention that an operating system for a gaming machine 10 and for a distributed gaming system 80 is provided which reduces the power hold-up requirements of a gaming machine 10 or the gaming system 80, as the case may be. The operating system also facilitates the storage of critical or non-reproducible data. More particularly the meter update transactions can be written to meter RAM quickly (eg a maximum sized transaction of 256 bytes can be written in under 200 μS). The power supply hold-up requirement of the meter RAM controller board for this short time is much easier to meet than is required in a conventional gaming machine where the far more powerful main CPU and associated logic must be powered and a customised power supply is needed.

Still further, the use of local power supply units in the meter RAM board 34 and the mechanical meter board 24 obviates the need for power fail warning systems for the main controller of the gaming machine 10 or the distributed gaming system 80, as the case may be. This reduces the cost of the power supply and, hence, the gaming machine 10 or system 80.

The hold-up time required to effect a data entry in the meter RAM is dramatically decreased by having the facility to allow the meter update potentially to fail but to detect and undo the failed update when the power is restored by using a previously stored backup copy of the data. The hold-up time, in effect, is reduced to the time taken to update, at most, several memory locations instead of the previous necessity to update all memory locations in the transaction.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of updating data on meter Random Access Memory (RAM) of a gaming system, the method including:

creating a backup copy of the data in the meter RAM and storing the backup copy in a predetermined, second data storage location of a memory device of the meter;

determining whether the data in the meter RAM is to be updated;

in response to determining that the data in the meter RAM is to be updated, setting a status of an indicator to an updating state;

determining whether the power from a dedicated local power supply has failed and determining whether the status of the indicator is the updating state; and in response to determining that the power from the dedicated local power supply has failed and the status of the indicator is the updating state, restoring data in the meter RAM using the backup copy;

wherein, in the event of a power failure, the dedicated local power supply provides a hold-up time sufficient to set the status of the indicator to the updating state.

2. The method of claim 1 in which the indicator is a flag and in which the method includes examining the status of the flag every time power is restored after a power failure to determine if the power failure interrupted a meter update.

3. The method of claim 2 which includes, once an updated transaction has been received by the memory device and a backup copy has been made, changing the flag status to the updating state.

4. The method of claim 3, which includes, processing the transaction and, when complete, changing the flag status to a not updating state.

5. The method of claim 1 which includes, if there has been an interruption to the meter update, using the contents at the second data storage location to restore the meter data.

6. The method of claim 5 which includes writing the data at the second data storage location to a first data storage location to overwrite any data at the first data storage location potentially corrupted due to the power failure.

7. A gaming machine comprising:

a processor and a memory, wherein the processor is configured to:

create a backup copy of data from a meter Random Access Memory (RAM) and store the backup copy in a predetermined second data storage location;

determine whether data in the meter RAM is to be updated;

in response to determining that the data in the meter RAM is to be updated, set a status of an indicator to an updating state;

determine whether the power from a dedicated local power supply has failed and determine whether the status of the indicator is the updating state; and in response to determining that the power from the dedicated local power supply has failed and the status of the indicator is the updating state, restore data in the meter RAM using the backup copy;

wherein, in the event of a power failure, the dedicated local power supply is to provide a hold-up time sufficient to set the status of the indicator to the updating state.

8. The gaming machine of claim 7 in which the indicator is a flag and in which the processor is to examine the status of the flag every time power is restored after a power failure to determine if the power failure interrupted a meter update.

9. The gaming machine of claim 8 wherein, once an updated transaction has been received by the memory device and a backup copy has been made, the flag status is to be changed to the updating state.

10. The gaming machine of claim 9, wherein the processor is to process the transaction and, when complete, change the flag status to a not updating state.

11. The gaming machine of claim 7 in which, if there has been an interruption to the meter update, contents at the second data storage location are to be used to restore the meter data.

12. The gaming machine of claim 11, wherein the processor is to write the data at the second data storage location to a first data storage location to overwrite any data at the first data storage location potentially corrupted due to the power failure.

* * * * *